United States Patent
Verma

(10) Patent No.: US 12,328,793 B2
(45) Date of Patent: Jun. 10, 2025

(54) METHOD AND SYSTEM FOR CARD ASSIGNMENT, ALLOCATION, AND DISTRIBUTION TO END DEVICES

(71) Applicant: Verizon Patent and Licensing Inc., Basking Ridge, NJ (US)

(72) Inventor: Tarun Verma, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 469 days.

(21) Appl. No.: 17/583,282

(22) Filed: Jan. 25, 2022

(65) Prior Publication Data

US 2023/0239676 A1  Jul. 27, 2023

(51) Int. Cl.
*H04W 8/18* (2009.01)
*H04B 1/3816* (2015.01)
*H04W 4/60* (2018.01)
*H04W 48/18* (2009.01)

(52) U.S. Cl.
CPC .......... *H04W 8/183* (2013.01); *H04B 1/3816* (2013.01); *H04W 4/60* (2018.02); *H04W 48/18* (2013.01)

(58) Field of Classification Search
None
See application file for complete search history.

(56) References Cited

U.S. PATENT DOCUMENTS

| 10,791,459 | B1* | 9/2020 | Hu | H04W 8/245 |
| 2017/0332274 | A1* | 11/2017 | Link, II | H04M 15/851 |
| 2019/0044911 | A1* | 2/2019 | Matsumoto | H04W 80/04 |
| 2023/0073252 | A1* | 3/2023 | Chaugule | H04W 60/04 |

* cited by examiner

*Primary Examiner* — Jinsong Hu
*Assistant Examiner* — Alexander J Yi

(57) ABSTRACT

A method, a device, and a non-transitory storage medium are described in which a card assignment, allocation, and distribution service is provided. The service may include generating vendor-agnostic identifiers that create a unified inventory among cards of different vendors. The service may also include generating vendor-agnostic identifiers with criterion data based on the vendor-agnostic identifiers. The criterion data may be used to steer and distribute cards among distribution devices associated with different vendor platforms. The vendor-agnostic identifiers with criterion data may optimize or minimize the generation and storage of data used to manage allocation and distribution of cards. Also, the vendor-agnostic identifiers with criterion data may reduce and/or streamline the network processing in allocation and distribution procedures of the cards to end devices.

20 Claims, 15 Drawing Sheets

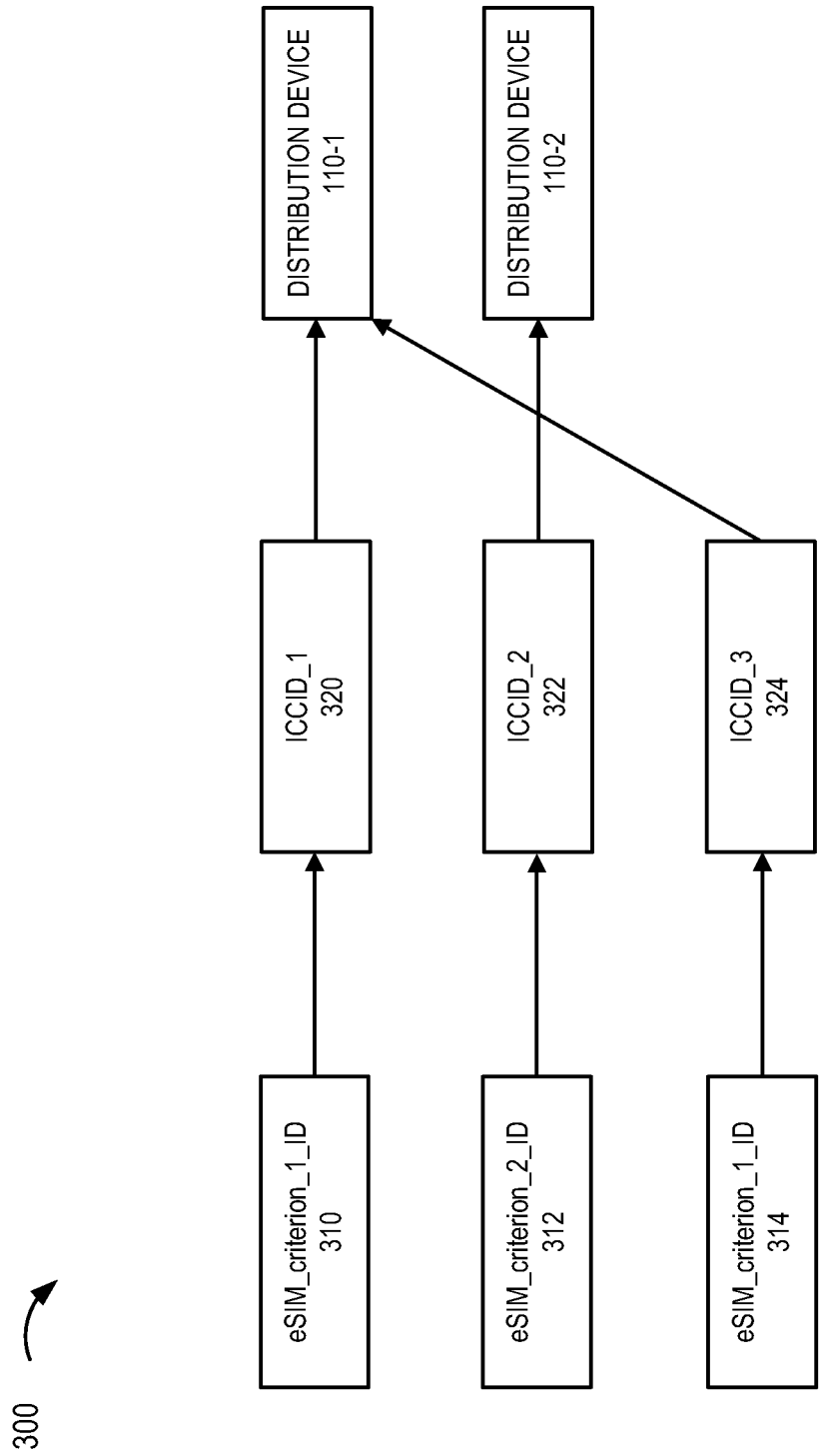

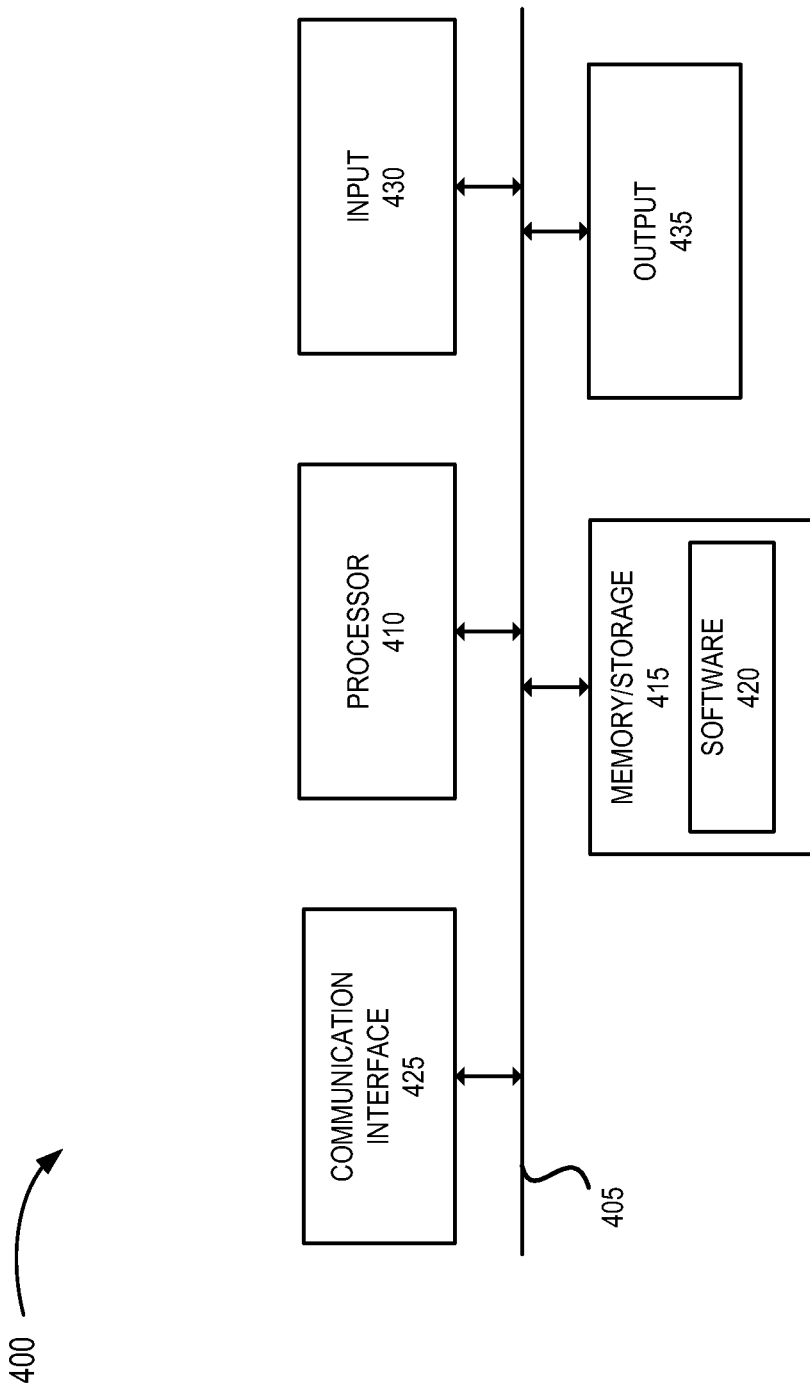

METHOD AND SYSTEM FOR CARD ASSIGNMENT, ALLOCATION, AND DISTRIBUTION TO END DEVICES

BACKGROUND

Service providers, network providers, and other types of entities may manage the allocation and assignment of subscriber identification modules (SIM) cards and/or other types of cards to end devices for use in accessing various networks and application services.

BRIEF DESCRIPTION OF THE DRAWINGS

FIG. 3B is a diagram illustrating yet another exemplary card assignment, allocation, and distribution service process;

FIG. 4 is a diagram illustrating exemplary components of a device that may correspond to one or more of the devices illustrated and described herein.

DETAILED DESCRIPTION

Figure 1:
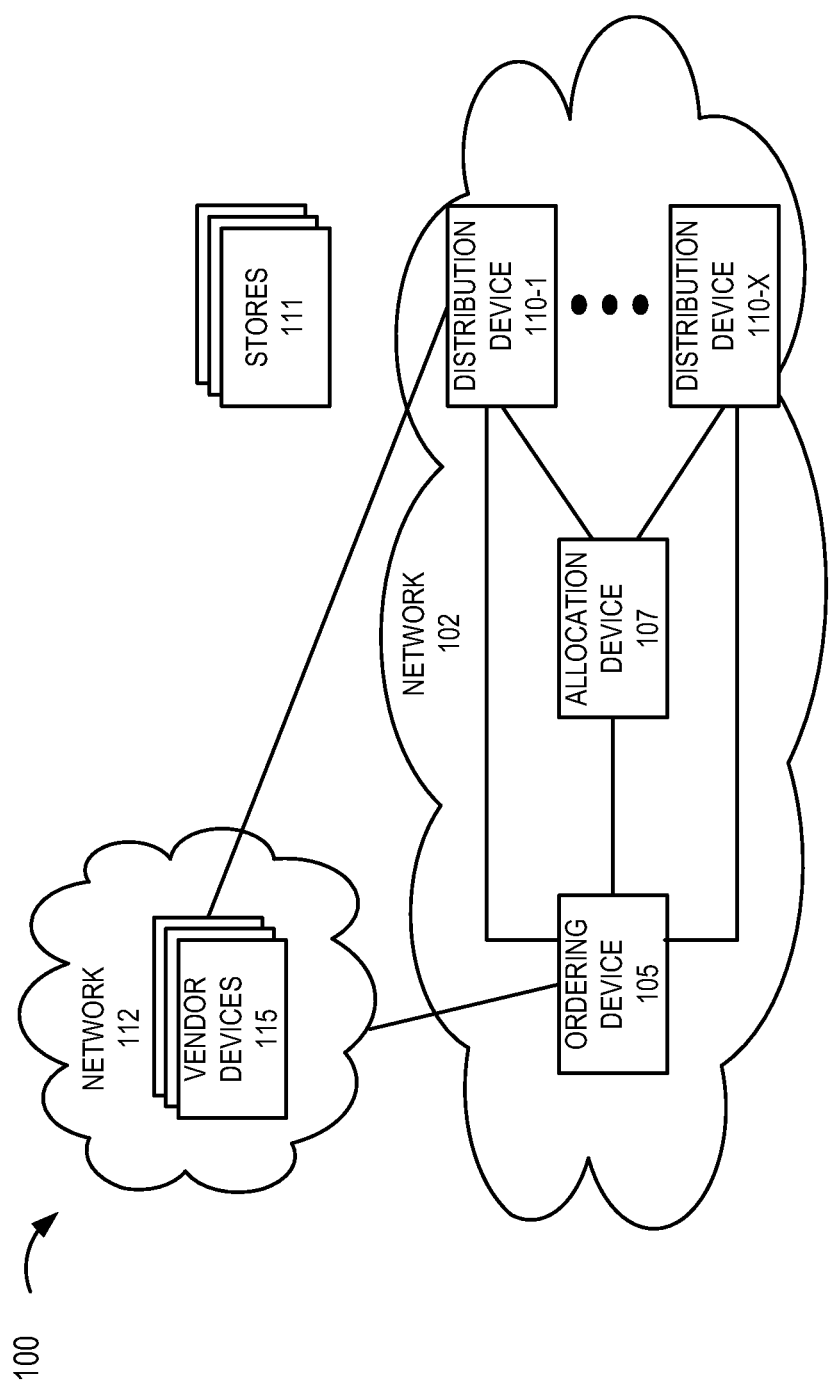
FIG. 1 is a diagram illustrating an exemplary environment in which an exemplary embodiment of a card assignment, allocation, and distribution service may be implemented.

The following detailed description refers to the accompanying drawings. The same reference numbers in different drawings may identify the same or similar elements. Also, the following detailed description does not limit the invention.

A service provider, a network provider, or another type of entity may have to manage various aspects of end devices that support the provisioning of wireless access to various networks and application services. For example, the entity may have to acquire, assign, distribute, and/or manage SIMs, embedded SIMs (eSIMs), Universal SIMS (USIMs), 5G USIMs (or another generation SIMs), Universal Integrated Circuit Cards (UICCs), embedded UICCs (eUICCs), and/or similar types of components (referred to individually or collectively as "card" or "cards") that may be used by various types of end devices, as described herein. Additionally, a physical card (also referred to as a "p-card") may relate to a SIM, a USIM, a 5G USIM, a UICC, or the like, and an embedded card (also referred to as an "e-card) may relate to an eSIM, an eUICC, eSIM binary, a digital SIM, a software component of a p-card, or the like. Depending on the end device, such as a smartphone, a mobile phone, an Internet of Things (IoT) device, a drone, a smart device, or another type of wireless end device, such end device may not be able to use any card (e.g., SIM, eSIM, etc.) but a particular type of card.

The entity may use a system to acquire cards from various vendors and assign the cards to the end devices associated with current and prospective users or subscribers of the entity, for example. The system may acquire cards that have associated vendor-specific identifiers (e.g., stock keeping units or other types of identifiers, strings, or codes) that may be used as a basis to manage the assignment of cards to various end devices. The system may use a stock keeping unit (or another type of identifier, string, or code) pertaining to an end device to determine and select a compatible card, which is associated with a vendor-specific identifier. However, this approach limits the inventory available for matching and selecting a suitable card for the end device because cards from other vendors may also be compatible. Further, the identifiers, such as SKUs, typically include data indicating the vendor and may be used by the system for purchasing, assigning, managing, and distributing the cards for use by the end devices. For example, the system may be unable to purchase the same card from different vendors without the vendor-specific identifier of the card, which includes vendor-specific data indicating a particular vendor. Also, users may purchase end devices and the SKUs of the end devices may be used by the system to determine and select a suitable card based on the vendor-specific SKU of the card, for example.

As a further complexity, the system may assign and/or allocate cards to distribution devices, which may store the cards and include logic that may manage the selection and downloading of the cards (e.g., eSIM, etc.) to authorized end devices, among other things. The system may use the vendor-specific SKUs of the cards to determine the assignments and/or allocations among multi-vendor distribution platforms and/or multiple distribution platforms of the same vendor. However, the assignment of the same vendor-specific SKU item is problematic when the multi-vendor and/or multiple distribution platforms of the same vendor are within the same environment because the vendor-specific SKU does not include data pertaining to a particular location and/or vendor associated with the distribution device.

According to an exemplary embodiment, a card assignment, allocation, and distribution service is described. According to an exemplary embodiment, the card assignment, allocation, and distribution service may generate a vendor-agnostic identifier, as described herein. The vendor-agnostic identifier may be used for the assignment, allocation, and distribution of cards to end devices, as described herein. According to an exemplary embodiment, the card assignment, allocation, and distribution service may generate the vendor-agnostic identifier based on a vendor-specific identifier, such as stock keeping unit data, inventory data, or another type of identifier, number, code, or value pertaining to a card (referred to as "card product data"). In contrast to the vendor-specific SKU, for example, the vendor-agnostic identifier does not include data indicating the vendor but may retain the card product data.

According to an exemplary embodiment, the card assignment, allocation, and distribution service may generate criterion data, as described herein. For example, the criterion data may include data pertaining to a criterion associated with allocation, management, and/or distribution of the card to end devices and/or users, as described herein. For example, the criterion data may indicate a location, a vendor, and/or another criterion pertaining to a distribution device of a single and/or multi-vendor distribution platform environment, which distributes the cards. According to an exemplary embodiment, the card assignment, allocation, and distribution service may generate the criterion data based on purchasing ordering information and/or other criteria, as described herein. According to an exemplary embodiment, the vendor-agnostic identifier may include the criterion data, as described herein.

In view of the foregoing, the card assignment, allocation, and distribution service may provide a unified card inventory across all vendors for selection and use of compatible cards by end devices. In this way, all compatible cards may be considered instead of a portion thereof because of vendor-specific mappings. The card assignment, allocation, and distribution service may improve inventory management processes pertaining to allocation of cards to distribution devices, purchasing and re-ordering of cards, and pairing of compatible cards with end devices. For example, the card assignment, allocation, and distribution service may minimize the logistics associated with re-ordering because vendor-agnostic identifiers may eliminate vendor-specific inventory threshold values pertaining to minimum amounts of cards available for distribution across the system and on a per-distribution device level. Additionally, the management of steering and replenishing cards on distribution device, which may be associated with a location and/or a vendor may be simplified based on the unified card inventory and the criterion data. For example, the criterion data-aware card identifiers may eliminate the need for other or separate management data to be generated, correlated and/or mapped to card identifiers, and stored by the system (e.g., to keep track and manage where, which, and how many cards are to be allocated to each distribution device, retail location, etc.) because the vendor-agnostic identifier with the criterion data may include data to manage the allocation and distribution of cards as well as re-ordering and replenishment processes. Thus, the card assignment, allocation, and distribution service may reduce the storage of management data and may simplify and/or reduce an amount or degree of network processing to manage card assignment, allocation, and distribution for end devices.

FIG. 1 is a diagram illustrating an exemplary environment 100 in which an exemplary embodiment of a card assignment, allocation, and distribution service may be implemented. As illustrated, environment 100 include a network 102. Network 102 may include an ordering device 105, an allocation device 107, and distribution devices 110-1 through 110-X (also referred to as distribution devices 110 and individually or generally as distribution device 115). Environment 100 may include stores 111 (also referred to individually or generally as store 111) and a network 112. Network 112 may include vendor devices 115 (also referred to individually or generally as distribution device 115).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an access network (e.g., a radio access network), a core network, an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices are exemplary. For purposes of description, an end device is not considered a network device.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface (e.g., proprietary, etc.).

Network 102 may include one or multiple types of networks of one or multiple types of technologies. For example, network 102 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. Network 102 may be implemented to include a cloud network, a private network, a public network, the Internet, a packet data network (PDN), a service provider network, a data center, or other type of network that may provide access to and may host an end device application service.

Ordering device 105 may include a network device which includes logic that provides a function or a service of an exemplary embodiment of the card assignment, allocation, and distribution service. For example, ordering device 105 may manage purchasing orders for cards from vendor devices 115. Ordering device 105 may generate and transmit orders to vendor devices 115. According to an exemplary implementation, an order may include a vendor-specific identifier pertaining to a vendor-specific card of a vendor associated with vendor device 115. The order may include other information of relevance, such as the number of cards associated with the vendor-specific identifier. The order may include information pertaining to distribution device 110 or store 111. For example, the order may specify the number of e-cards associated with the vendor-specific identifier to be provided to distribution device 110 or p-cards to store 111.

According to various exemplary embodiments, ordering device 105 may or may not receive e-cards from vendor devices 115 responsive to the orders. For example, according to some exemplary embodiments, vendor device 115 may transmit e-cards to a particular distribution device 110 based on the purchasing order. Alternatively, for example, vendor device 115 may ship p-cards to a warehouse (not illustrated) or store 111 based on the purchasing order. According to some exemplary embodiments, the e-cards may be transmitted before the assignment and/or allocation services of allocation device 107, as described herein, have been initiated. According to other exemplary embodiments, the e-cards may be transmitted based on the completion or near completion of the allocation services of allocation device 107, as described herein. According to such exemplary embodiments, ordering device 105 may provide vendor devices 115 the allocation in response to the completion or near completion of the allocation services. For example, allocation device 107 may determine the allocation based on criteria, as described herein, which may be provided to vendor devices 115 via ordering device 105. Given the change of state associated with distribution devices 110 and/or stores 111 during the performance of the assignment and/or allocation services, the allocation may be different relative to when the purchasing order is initially transmitted to vendor devices 115. As such, the allocation of cards may more closely align with the current inventory needs of stores 111 and/or distribution devices 110 as well as end devices associated with current and prospective subscribers or users.

According to an exemplary embodiment, ordering device 105 may provide the cards corresponding vendor-specific identifiers to allocation device 107. For example, ordering device 105 may receive the vendor-specific identifiers from vendor devices 115 in response to the purchasing order.

Allocation device 107 may include a network device which includes logic that provides a function or a service of an exemplary embodiment of the card assignment, allocation, and distribution service. For example, allocation device 107 may analyze the vendor-specific identifier and remove the portion of data that indicates the vendor. In this way, allocation device 107 may generate a vendor-agnostic identifiers or allocation identifiers that each identifies and/or indicates one or multiple characteristics of the card.

According to an exemplary embodiment, allocation device 107 may generate and/or assign each of the cards of the vendor-agnostic identifier or the allocation identifier with a globally unique identifier. For example, allocation device 107 may generate and/or assign an integrated circuit card identifier to each of the cards. According to an exemplary embodiment, allocation device 107 may aggregate the globally unique identifiers of the same type of card, which may originate from different vendors, and create an inventory of cards.

According to an exemplary embodiment, allocation device 107 may further generate criterion data to include with the vendor-agnostic identifier or the allocation identifier. According to an exemplary embodiment, the criterion data pertains to a distribution of the cards, as described herein. According to an exemplary implementation, the criterion data may indicate a vendor associated with distribution device 110 or store 111 and/or a location associated with distribution device 110 or store 111. The vendor may or may not be different from the vendor associated with vendor device 115. According to some exemplary implementations, the criterion data may include a parameter and a value pertaining to the criterion. According to various exemplary implementations, the criterion data may indicate a location as a geographic area (e.g., city, state, region, or the like), a network address (e.g., an Internet Protocol address, a uniform resource identifier, a fully qualified domain name, or the like), or another type of configurable location indicator.

According to other exemplary implementations, the criterion data may be associated with other aspects associated with distribution device 110 or store 111. For example, the criterion data may indicate a type of end device (e.g., Internet of Thing (IoT) device, smartphone, end device operated by a user, an end device not operated by a user, or another category of end device) to which distribution device 110 or store 111 provides a distribution service and/or a type of distribution device 110 (e.g., a testing, a non-testing, a proof-of-concept, a production, a staging, or another type of distribution device) or a type of store 111 (e.g., a wireless service provider store, a kiosk, a general store, or another type of distribution site).

According to an exemplary embodiment, allocation device 107 may generate the criterion data based on the purchasing order from which the cards are obtained. For example, the purchasing order may specify a location, a vendor, and/or other criterion that may pertain to distribution device 110. According to another exemplary embodiment, allocation device 107 may generate the criterion based on inventory values from distribution devices 110 or stores 111. For example, as described herein, distribution device 110 may include logic that monitors an inventory of cards available for distribution and initiate a replenishment process of cards based on inventory threshold values. As a part of the replenishment process, allocation device 107 may steer or allocate cards to distribution device 110/store 111 and/or set a priority of replenishment of cards to one distribution device 110/store 111 over another distribution device 110/store 111 based on the current or prospective context relating to supply. For example, allocation device 107 may calculate the allocation based on the availability of eSIM subscriptions in the inventory, priority rules relating to ordering eSIM subscriptions from a vendor/vendor device 115, availability of distribution device 110, and priority rules related to the transaction costs associated with distribution device 110.

According to an exemplary embodiment, allocation device 107 may correlate or map a vendor-specific identifier of an end device with the vendor-agnostic identifier or the allocation identifier. For example, a stock keeping unit of the end device may be correlated to the vendor-agnostic identifier. Allocation device 107 may correlate the vendor-agnostic identifier or the allocation identifier to other information of relevance, such as the vendor-specific identifier of the card, for example. Allocation device 107 may store this information.

According to an exemplary embodiment, allocation device 107 may allocate the cards to distribution devices 110 based on the vendor-agnostic identifier or the allocation identifier associated with the cards. For example, allocation device 107 may segment the inventory of cards based on the criterion data and allocate the cards to respective distribution devices 110 or stores 111 according to the criterion data.

Distribution device 110 may include a network device which includes logic that provides a function or a service of an exemplary embodiment of the card assignment, allocation, and distribution service. According to an exemplary embodiment, distribution device 110 may provide a distribution service of the e-cards to end devices. For example, distribution device 110 may facilitate the downloading of suitable e-cards, which may be stored by distribution device 110, with end devices. For example, distribution device 110 may receive requests from the end devices for the e-cards. The end devices may install the -ecards and perform an onboarding and/or attachment procedure with a network (e.g., a radio access network, a core network, etc.) using the newly installed cards. Distribution device 110 may store and associate network-related information, such as an International Mobile Subscriber Identity (IMSI) or the like, with other identifiers, as described herein.

Although not illustrated in FIG. 1, for purposes of description, an end device may include a device that may have communication capabilities (e.g., wireless, wired, optical, etc.) and computational capabilities. The end device may be implemented as a mobile device, a portable device, a stationary device (e.g., a non-mobile device and/or a non-portable device), a device operated by a user, or a device not operated by a user. For example, the end device may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). The end device may be configured to execute various types of software (e.g., applications, programs, etc.). The number and the types of software may vary among the end devices. For purposes of description, the end device is not considered a network device. According to an exemplary embodiment, the end device may operate based on a card, as described herein.

The end device may support one or multiple radio access technologies (RATs) (e.g., Fourth Generation (4G), 5G, and/or future generation RAT) and various portions of the radio spectrum (e.g., multiple radio frequency (RF) bands, multiple carrier frequencies, licensed, unlicensed, millimeter (mm) wave, above mm wave, centimeter (cm) wave, etc.), various levels and genres of network slicing, dual connectivity (DC) service, carrier aggregation (CA) service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of the end device may vary among the end devices.

According to an exemplary embodiment, distribution device 110 may include logic that monitors the supply or inventory of the e-cards available for distribution and may initiate a replenishment process of cards based on inventory threshold values. For example, distribution device 110 may compare a current number of cards associated with the vendor-agnostic identifier, allocation identifier, or another identifier (e.g., vendor-specific identifier), as described to a corresponding threshold value. When the current number of e-cards does not satisfy the corresponding threshold value, distribution device 110 may initiate the replenishment process. For example, distribution device 110 may generate a request that indicates that the threshold value is not satisfied. The initiation of the replenishment process and/or the generation of the request may include human intervention/input. According to various exemplary implementations, distribution device 110 may transmit the request (or notification) to allocation device 107 and/or ordering device 105. Store 111 may be a location or a business that may provide p-cards to current and/or prospective subscribers or users of a wireless service.

Vendor device 115 may include a network device, which may be associated with a vendor, that provides cards to an entity. For example, vendor device 115 may supply cards, which may include e-cards, to ordering device 105 based on purchasing orders received from ordering device 105. The vendor may produce or manufacture one or multiple types of cards, which may be compatible for one or multiple types of end devices.

Figure 2A:
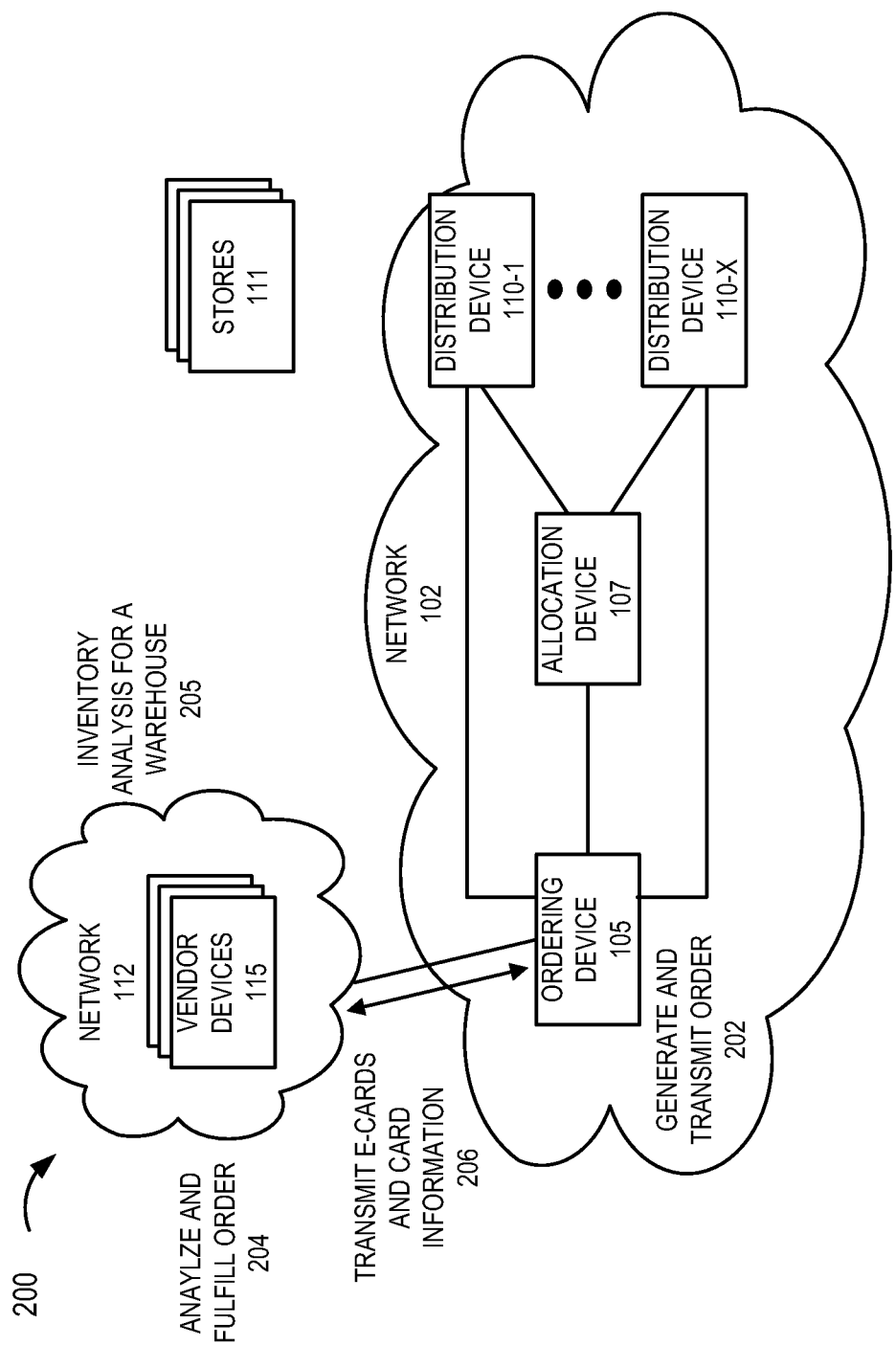
FIGS. 2A-2J are diagrams illustrating exemplary processes of exemplary embodiments of the card assignment, allocation, and distribution service.

FIGS. 2A-2J are diagrams illustrating exemplary embodiments of the card assignment, allocation, and distribution service. Referring to FIG. 2A of an exemplary process 200, according to an exemplary embodiment, ordering device 105 may generate and transmit order 202 to vendor devices 115. For example, the order may include a request to purchase cards from the vendor. The order may include a vendor-specific identifier pertaining to the type of card and the number of cards. The order may specify the warehouse (not illustrated) or store 111 to which vendor device 115 is to ship the p-cards. For e-SIMs and similar e-cards, the order may include a network address or other suitable uniform resource identifier (URI) or Frequently Qualified Domain Name (FQDN), for example, to which the vendor device 115 is to transmit the e-SIM binary files or the like. In response to receiving the order, vendor device 115 may analyze and fulfill the order 204. For example, vendor device 115 may perform an inventory analysis for a warehouse regarding the p-cards 205. By way of further example, vendor device 115 may ship the p-cards to a warehouse (not illustrated) when there is not sufficient inventory, determine that the warehouse has sufficient inventory relating to the p-cards, and/or transmit the e-SIM binary files and card information 206 pertaining to the cards (e.g., p-cards, e-cards) to ordering device 105.

Figure 2B:
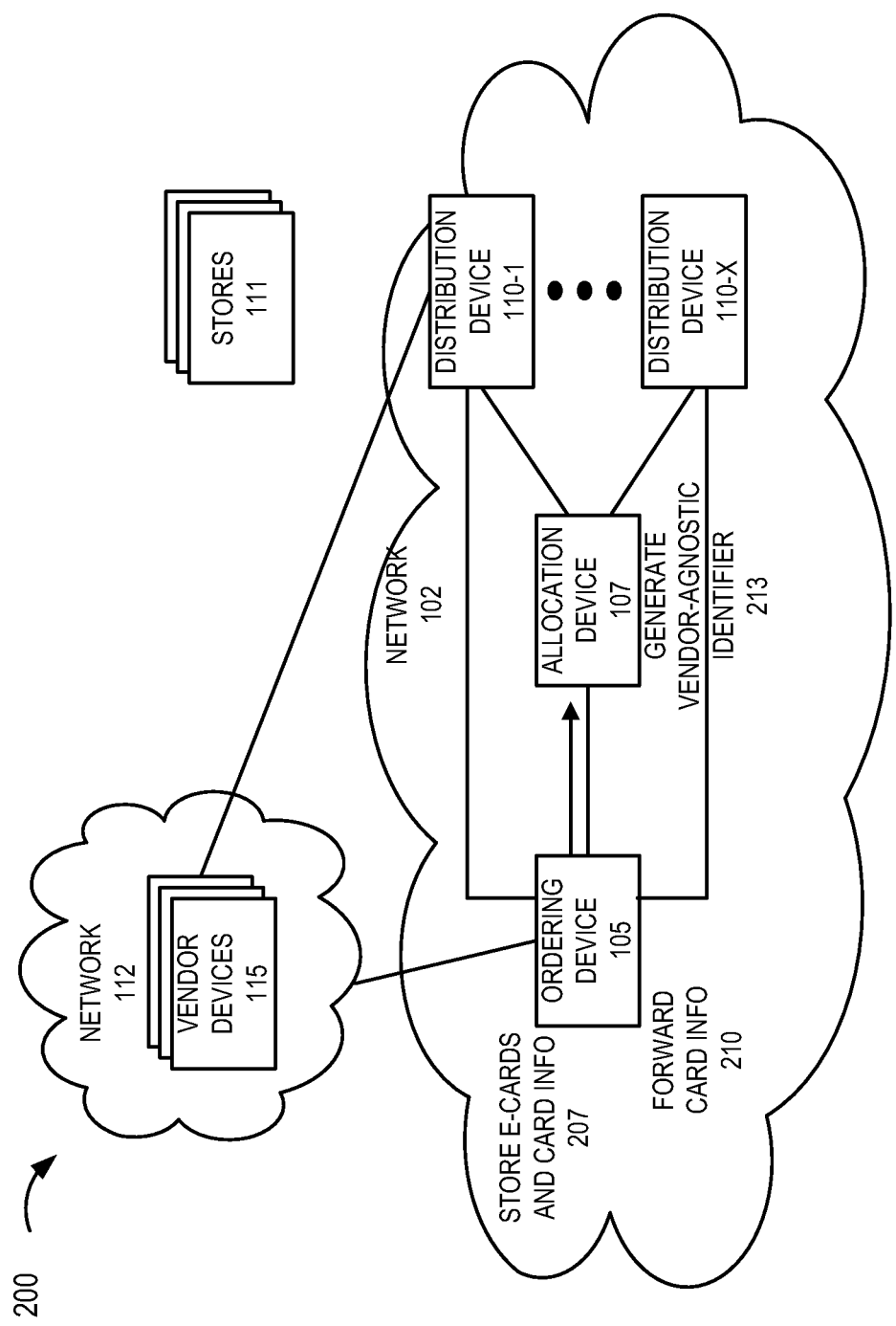
Figure 2C:
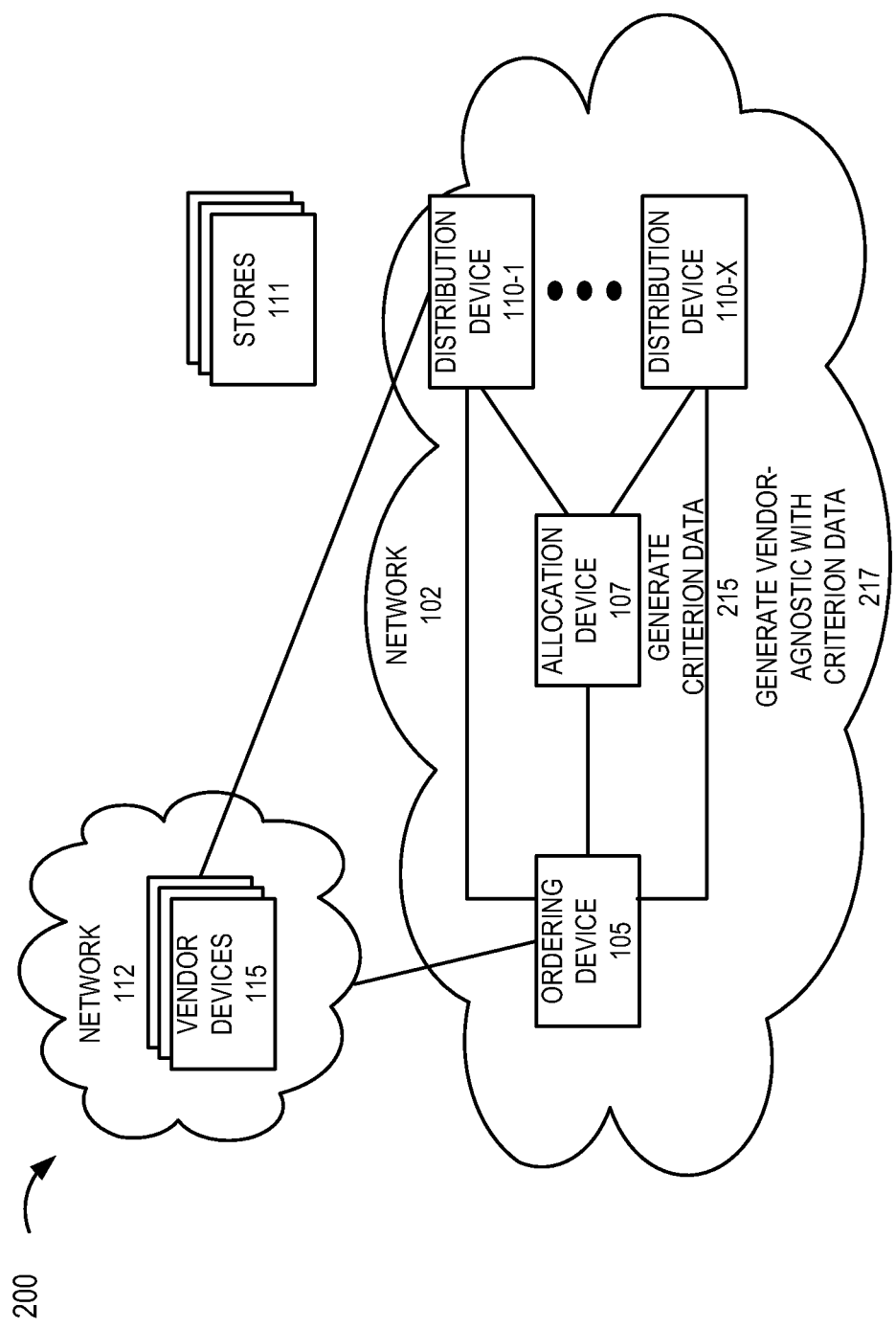

Referring to FIG. 2B, according to this example, ordering device 105 may receive and store the e-cards and card information 207. Ordering device 105 may perform a verification procedure regarding the received e-cards and card information to ensure that the corresponding order was satisfactorily fulfilled. According to other examples, vendor devices 115 may transmit the e-cards to another device (e.g., not shown) of network 102. As illustrated, according to this exemplary scenario, ordering device 105 may forward card information 210 to allocation device 107. For example, the card information may include the vendor-specific identifiers and other order information of relevance that may be included in the card information. According to other exemplary implementations, ordering device 105 may also forward the e-cards.

Figure 3A:
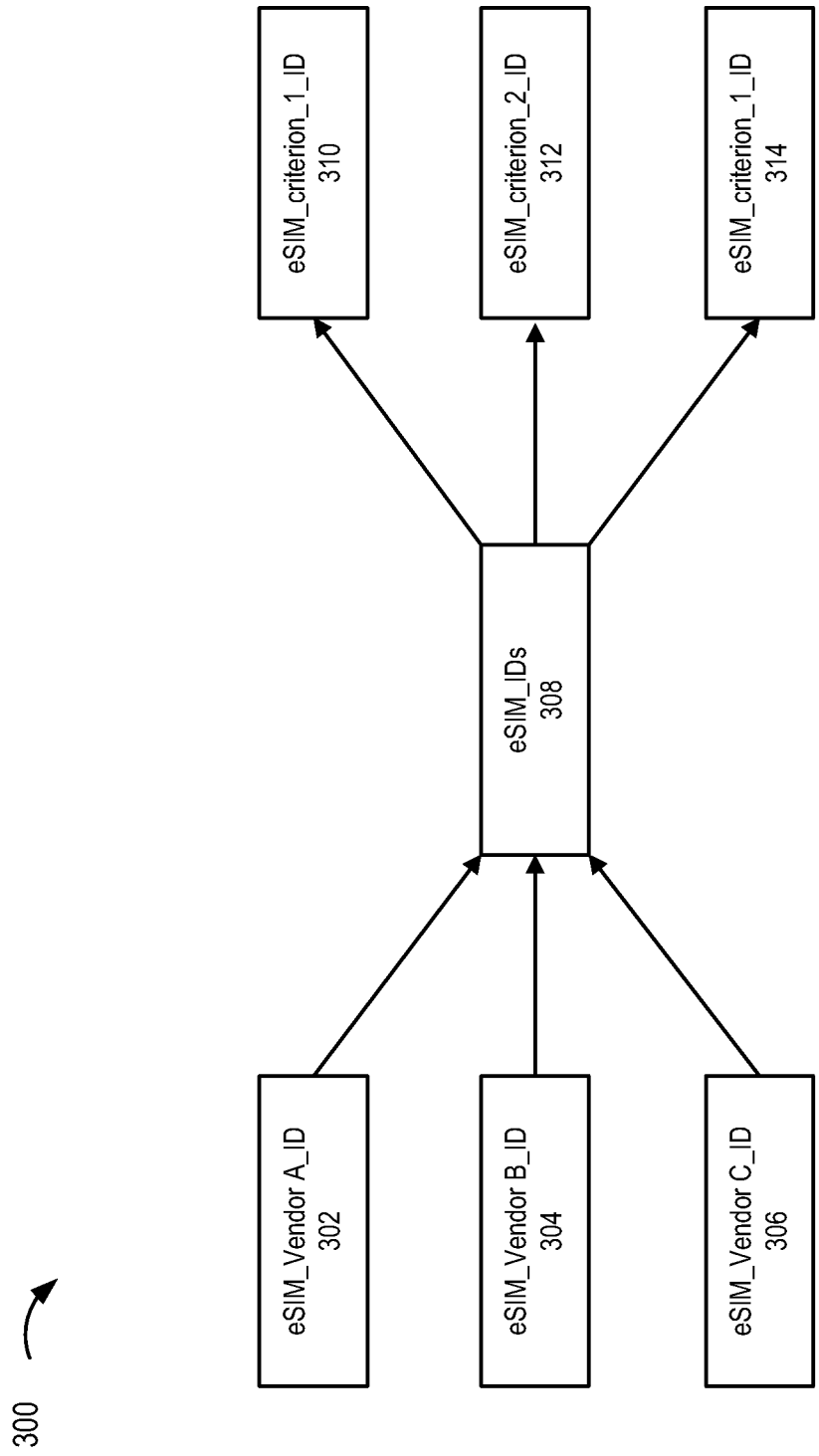
FIG. 3A is a diagram illustrating another exemplary card assignment, allocation, and distribution service process.

According to an exemplary embodiment of the card assignment, allocation, and distribution service, allocation device 107 may generate vendor-agnostic identifiers 213. For example, referring to FIG. 3A of exemplary process 300, allocation device 107 may receive vendor-specific identifiers 302, 304, and 306 that relate to the same type of eSIM, for example, but are from different vendors A, B, and C. Allocation device 107 may read each vendor-specific identifier and remove the data indicating each vendor from each vendor-specific identifier 302, 304, and 306, and generate vendor-agnostic identifiers, such as eSIM IDs 308. The vendor-agnostic identifiers may include or retain the card product data included in the vendor-specific identifiers. In this way, allocation device 107 may provide a unified card inventory across all vendors for selection and use of compatible cards by end devices.

Referring back to FIG. 2C, allocation device 107 may generate criterion data 215 for the cards and their vendor-agnostic identifiers. As previously described, according to various exemplary embodiments, allocation device 107 may generate the criterion data based on order information, a replenishment process, and/or another criteria, as described herein. Referring back to FIG. 3A, allocation device 107 may generate or assign criterion data for each vendor-agnostic identifier, such as eSIM_ID 308, and generate vendor-agnostic identifiers with criteria data, such as an eSIM_criterion_1_ID 310, an eSIM_criterion_2_ID 312, and an eSIM_criterion_1_ID 314.

According to some exemplary embodiments, the purchasing order may indicate criterion data that pertains to the cards associated with the vendor-specific identifier. Allocation device 107 may correlate or map the vendor-agnostic identifiers to their corresponding vendor-specific identifiers and order information, and based on the correlation, generate or select the criterion data. According to another exemplary embodiment, allocation device 107 may generate the criterion data based on a replenishment process. For example, as illustrated and described herein, distribution device 110 may report an inventory level associated with an e-card-and-end device mapping. Based on this information, allocation device 107 may steer or allocate e-cards to such distribution device 110 when current or prospective levels of inventory may be below a threshold value.

Figure 2D:
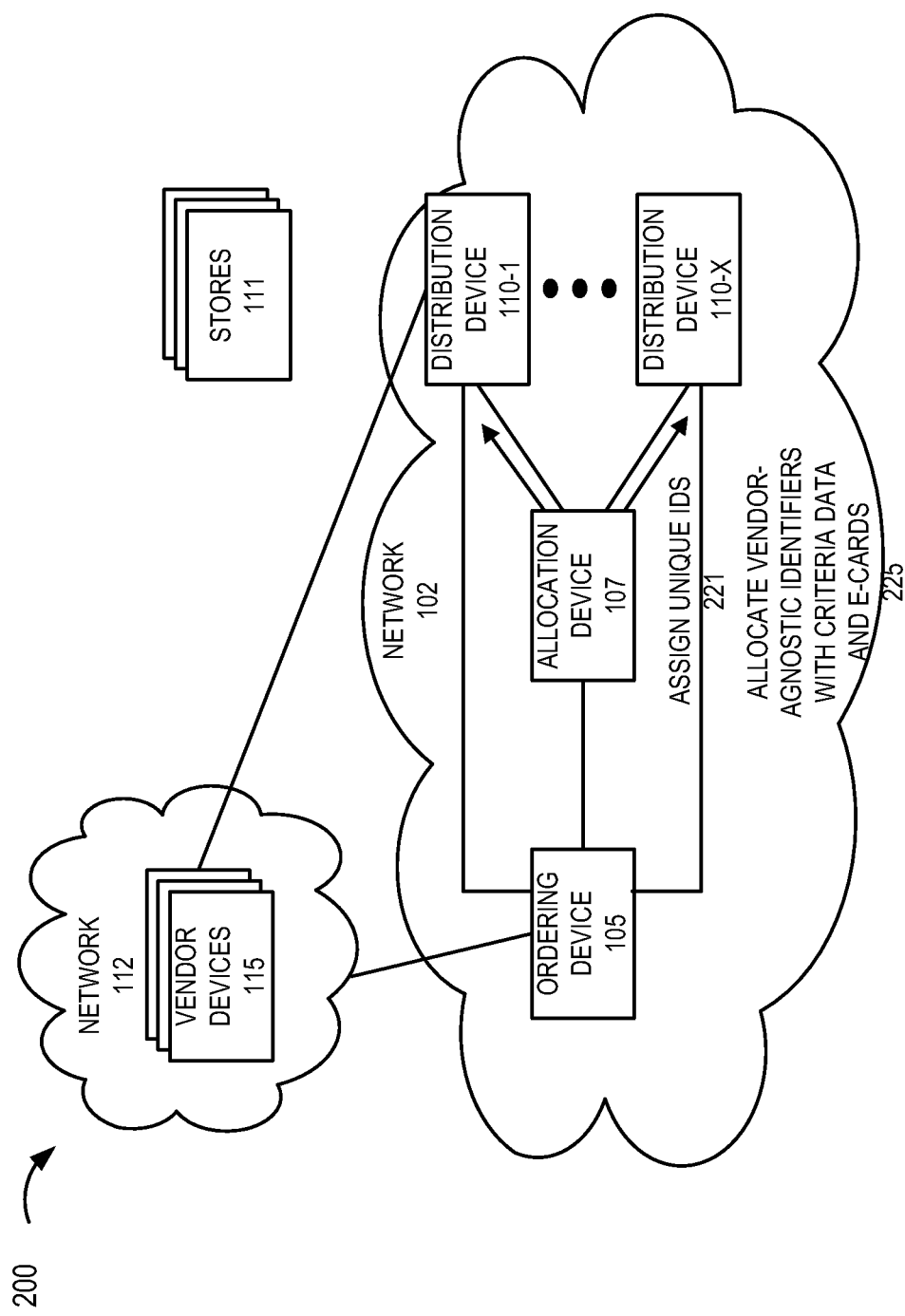

Referring to FIG. 2D, allocation device 107 may assign unique identifiers 221 relative to the vendor-agnostic identifiers or the vendor-agnostic identifiers with criteria data. For example, the unique identifiers may be implemented as globally unique identifiers, such as an integrated circuit card identifier (ICCID) or another type of identifier that identifies each card. Allocation device 107 may also assign other types of identifiers. For example, the other types of identifiers may be implemented as IMSIs, subscription permanent identifiers (SUPIs), or the like. FIG. 3B illustrates the assignment process in which allocation device 107 may assign an ICCID_1 320, an ICCID_2 322, and an ICCID_3 324 to eSIM_criterion_1_ID 310, eSIM_criterion_2_ID 312, and an eSIM_criterion_1_ID 314. Allocation device 107 may store these mappings of information to the vendor-agnostic identifiers.

Figure 2E:
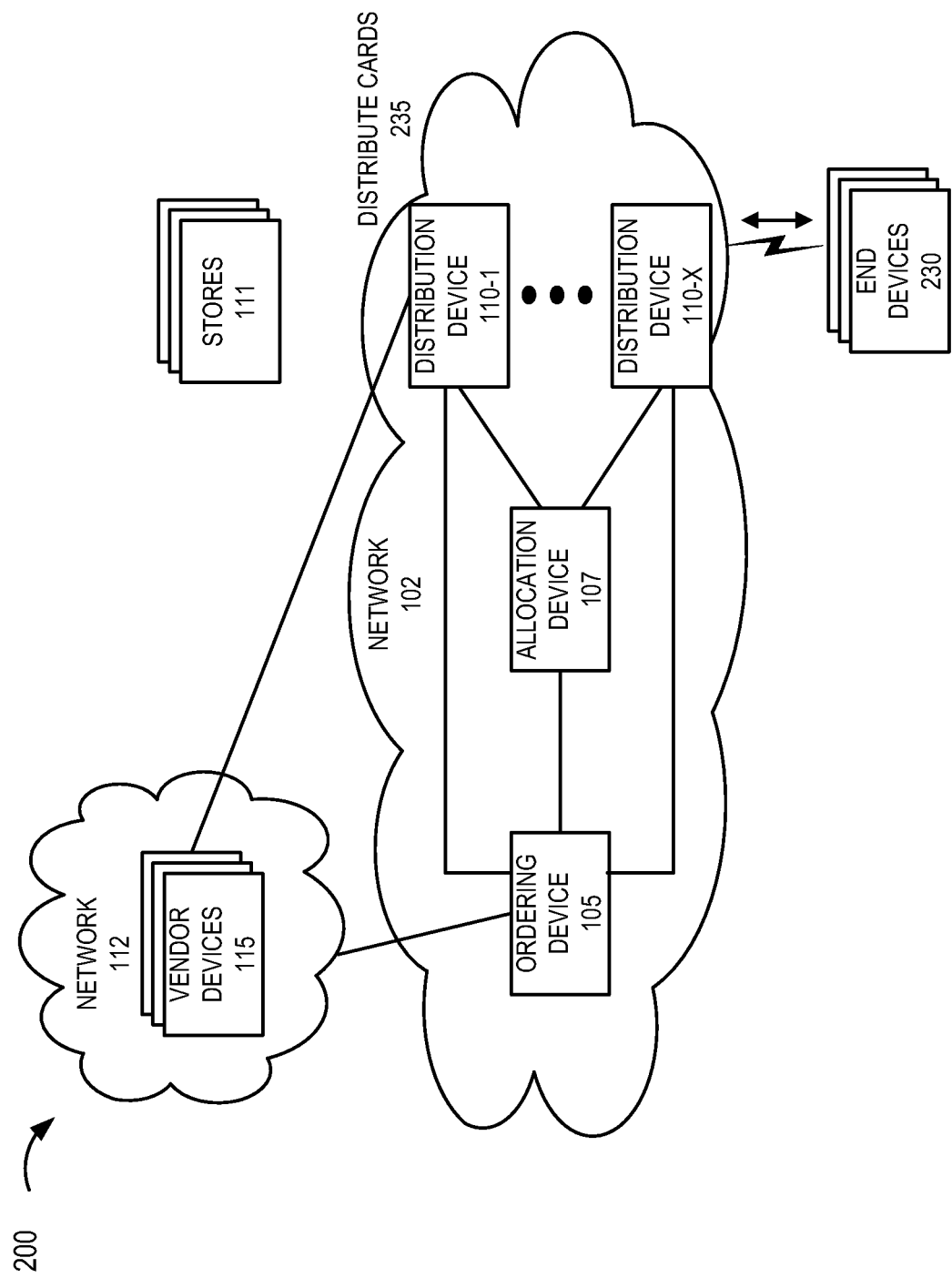

As further illustrated in FIG. 2D, allocation device 107 may allocate the vendor-agnostic identifiers with criteria data and e-cards 225 to respective distribution devices 110. For example, allocation device 107 may allocate e-cards associated with eSIM_criterion_1_ID 310 and eSIM_criterion_1_ID 314 to distribution device 110-1 and e-card associated with eSIM_criterion_2_ID 312 to distribution device 110-2, as illustrated in FIG. 3B. In this way, allocation device 107 may provision the e-cards and the mapped information on distribution devices 110 in a coextensive manner or procedure. In FIG. 2E, distribution devices 110 may store the e-cards and mapped information, and disburse the e-cards 235 according to the distribution service, as described herein. Additionally, although not illustrated, allocation device 107 may provide the mapped information of p-cards to a network device (e.g., a business support system (BSS) or the like) that may be used by store 111 and/or a person associated with store 111 for disbursement of the p-cards. Although not illustrated, users of end devices 230 may obtain p-cards from stores 111 directly or request from stores 111 the p-cards to be shipped to the users.

Figure 2F:
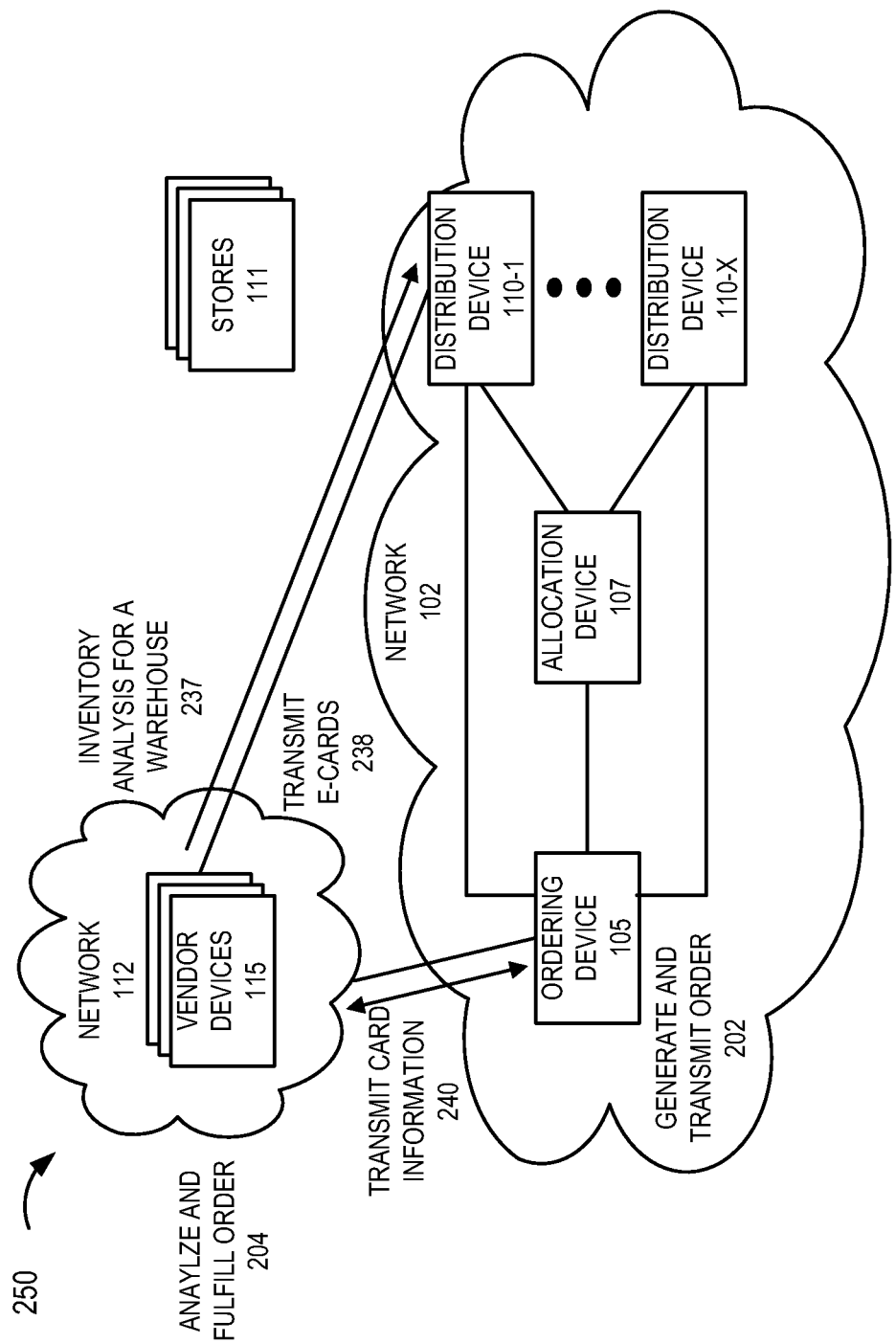

As previously mentioned, according to an exemplary embodiment, the e-cards and the mapped information may be transmitted based on the completion of the allocation services of allocation device 107. As such, the allocation of cards and mapped information may more closely align with the current inventory needs of stores 111 and/or distribution devices 110 as well as end devices 230 associated with current and prospective subscribers or users. For example, as illustrated in FIG. 2F, according to other exemplary embodiments, vendor devices 115 may transmit the e-cards to distribution devices 110 as a part of analyzing and fulfilling the order procedure (as described in relation to step 204). For example, vendor devices 115 may evaluate inventory of p-cards for a warehouse 237 (e.g., determine whether shipment of p-cards is necessary or not) and transmit e-cards 238 to distribution devices 110 of a process 250. Vendor devices 115 may also transmit card information 240 to ordering device 105. According to such an exemplary embodiment, the allocation of e-cards to distribution devices 110 is determined prior to transmitting the purchasing order, by ordering device 105, to vendor devices 115. For example, allocation device 107 may determine the allocation based on criteria, as described herein. Additionally, the period of time to ingest and generate the mapped information for the cards, may be significant (e.g., less than half a day, multiple hours). Given the change of state associated with distribution devices 110 and/or stores 111 during the performance of the assignment and/or allocation services, the allocation may be different relative to when the purchasing order is initially transmitted to vendor devices 115. In turn, the management and distribution of cards may be markedly optimized and improved.

Figure 2G:
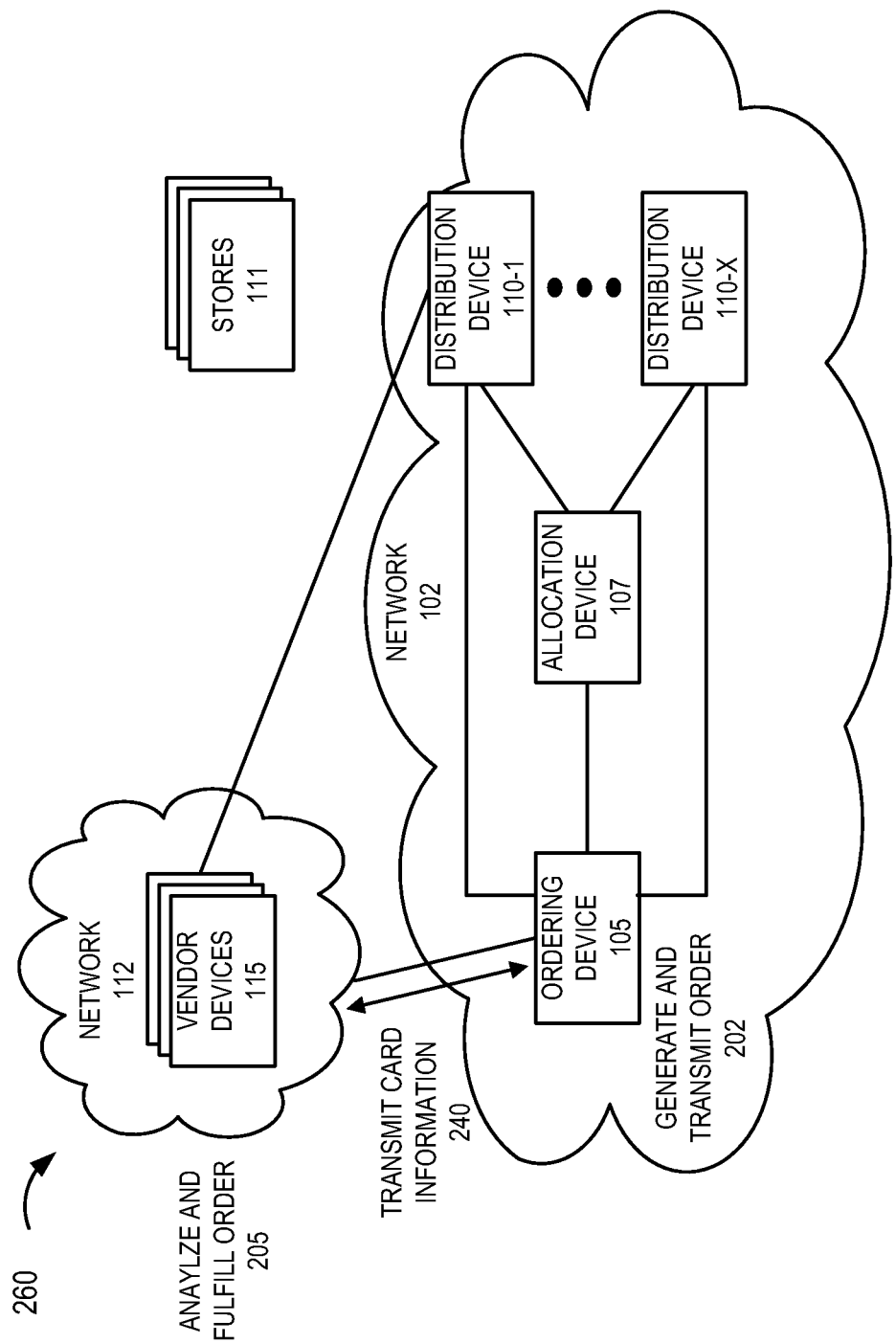
Figure 2H:
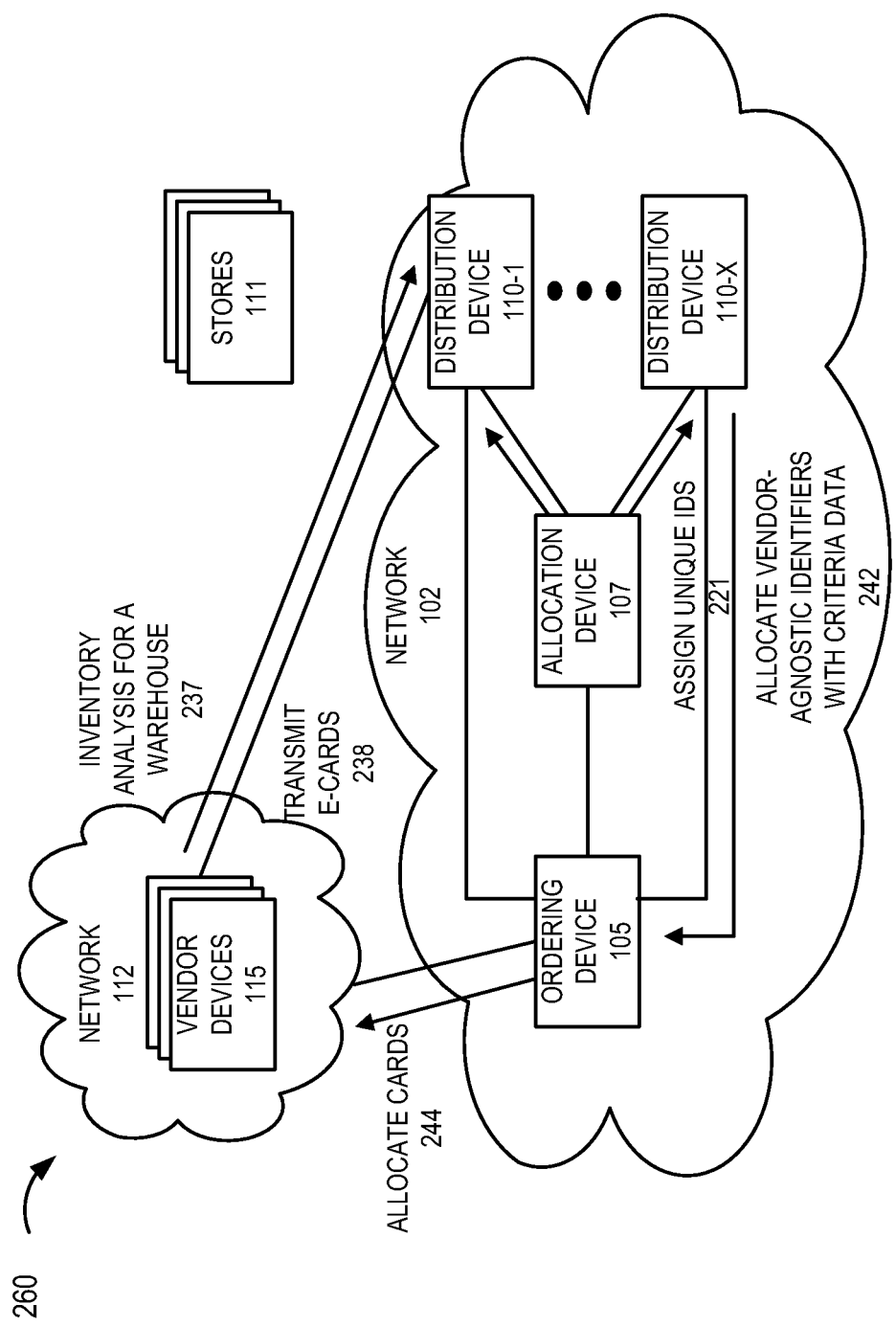

According to yet another exemplary embodiment, referring to FIG. 2G of a process 260, based on the purchasing order, vendor devices 115 may provide the card information 240 to ordering device 105. However, unlike process 250, vendor devices 105 may suspend the transmitting of e-cards to distribution device 110. Depending on the time allotted for shipment, vendor devices 105 may suspend shipment of p-cards to warehouses and/or stores 111 as well. Referring to FIG. 2H, as a part of the allocation service previously described in relation to FIG. 2D of process 200, when allocation device 107 completes or is near completion of the allocation services, allocation device 107 may provide to vendor devices 115 via ordering device 105 the allocation of e-cards and/or p-cards 244. For example, the allocation may include network addresses, URIs, FQDNs, or the like pertaining to distribution devices 110, the number of e-cards, the product type of e-cards, and so forth. Similarly, the allocation may include name and/or location of stores 111/ warehouse(s), the number of p-cards, the product type of p-cards, and so forth. As previously described, given the change of state associated with distribution devices 110 and/or stores 111 during the performance of the assignment and/or allocation services, the allocation may be different relative to when the purchasing order is initially transmitted to vendor devices 115. In response to the allocation, vendor devices 115 may ship, verify inventory of a warehouse, and/or transmit the cards in accordance with the allocation, as previously explained.

Figure 2I:
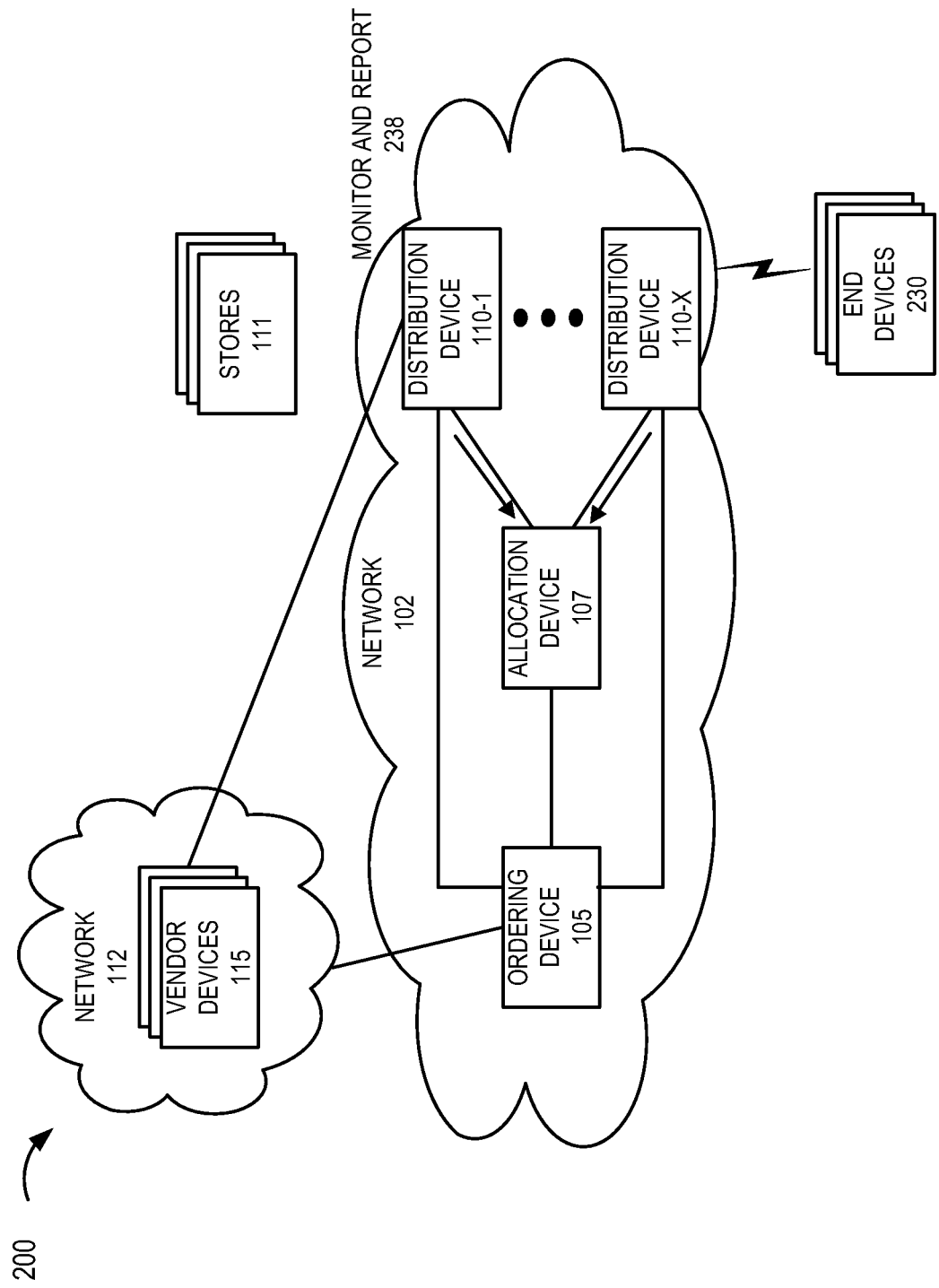
Figure 2J:
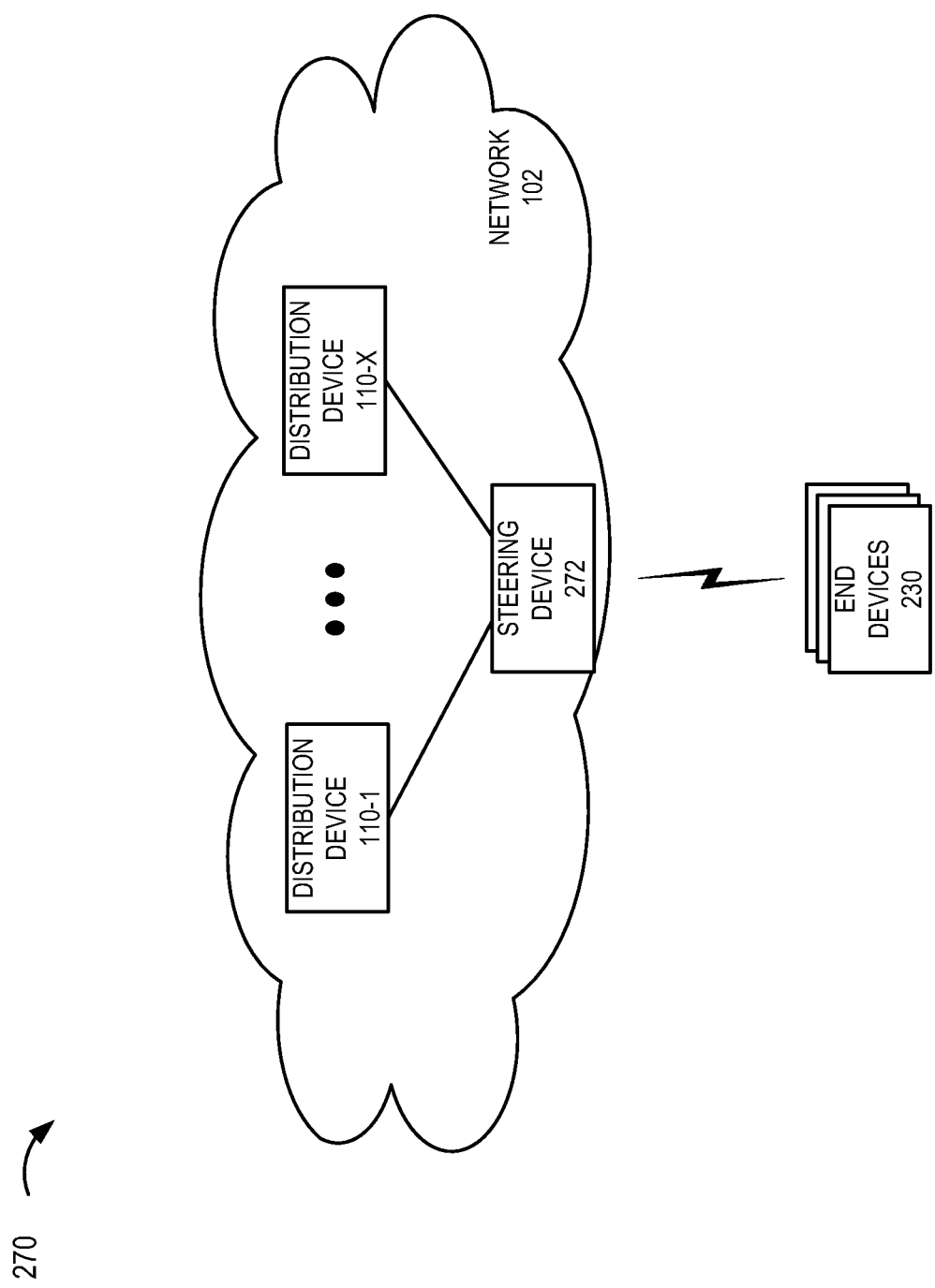

As illustrated in FIG. 2I, each distribution device 110 may monitor and report 238 to allocation device 107 and/or ordering device 105 inventory levels for the cards. A similar procedure may be performed on behalf of or by store 111. Based on the report, the replenishment process may be invoked. For example, the replenishment process may include an ordering process, as described herein, as well as subsequent assignment and allocation procedures, as described herein according to the card assignment, allocation, and distribution service.

As previously explained in relation to FIG. 2E, distribution devices 110 may store the e-cards and mapped information, and disburse the e-cards 235 according to the distribution service, as described herein. According to an exemplary embodiment of the card assignment, allocation, and distribution service, the distribution service may include an analytics and steering service. For example, referring to FIG. 2J, an exemplary environment 270 is illustrated. In addition to the previous described devices, networks, and communication links, environment 270 may include a steering device 272. For example, steering device 272 may be included in a business support system (BSS), a subscription management system, or a standalone device. Steering device 272 may include logic that obtains metrics from distribution devices 110, analyzes the metrics, and steers requests from end devices 230 for e-card downloads, to distribution device 110 in an optimal manner. For example, in view of the mapped information, which eliminates vendor-specific SKU-to-end device 230 pairings, steering device 272 may be configured to analyze inventory of various e-cards on respective distribution devices 110, evaluate different fixed and variable costs that may be vendor-specific to each distribution device 110, resource utilizations at each distribution device 110, number of transactions fulfilled over a time period, and other configuration parameters. In this way, steering device 272 may fulfill e-card download requests from end device 230 based on the analytics and steering service.

FIGS. 2A-2J illustrate and describe exemplary processes of exemplary embodiments of the card assignment, allocation, and distribution service, however according to other exemplary embodiments, the card assignment, allocation, and distribution service may include additional, different and/or fewer operations relative to those described.

FIG. 4 is a diagram illustrating exemplary components of a device 400 that may be included in one or more of the devices described herein. For example, device 400 may correspond to ordering device 105, allocation device 107, distribution device 110, end device 230, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to allocation device 107, software 420 may include an application that, when executed by processor 410, provides a function and/or a process of card assignment, allocation, and distribution service, as described herein. Additionally, with reference to ordering device 105 and/or distribution device 110, software 420 may include an application that, when executed by processor 410, provides a function and/or a process of card assignment, allocation, and distribution service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
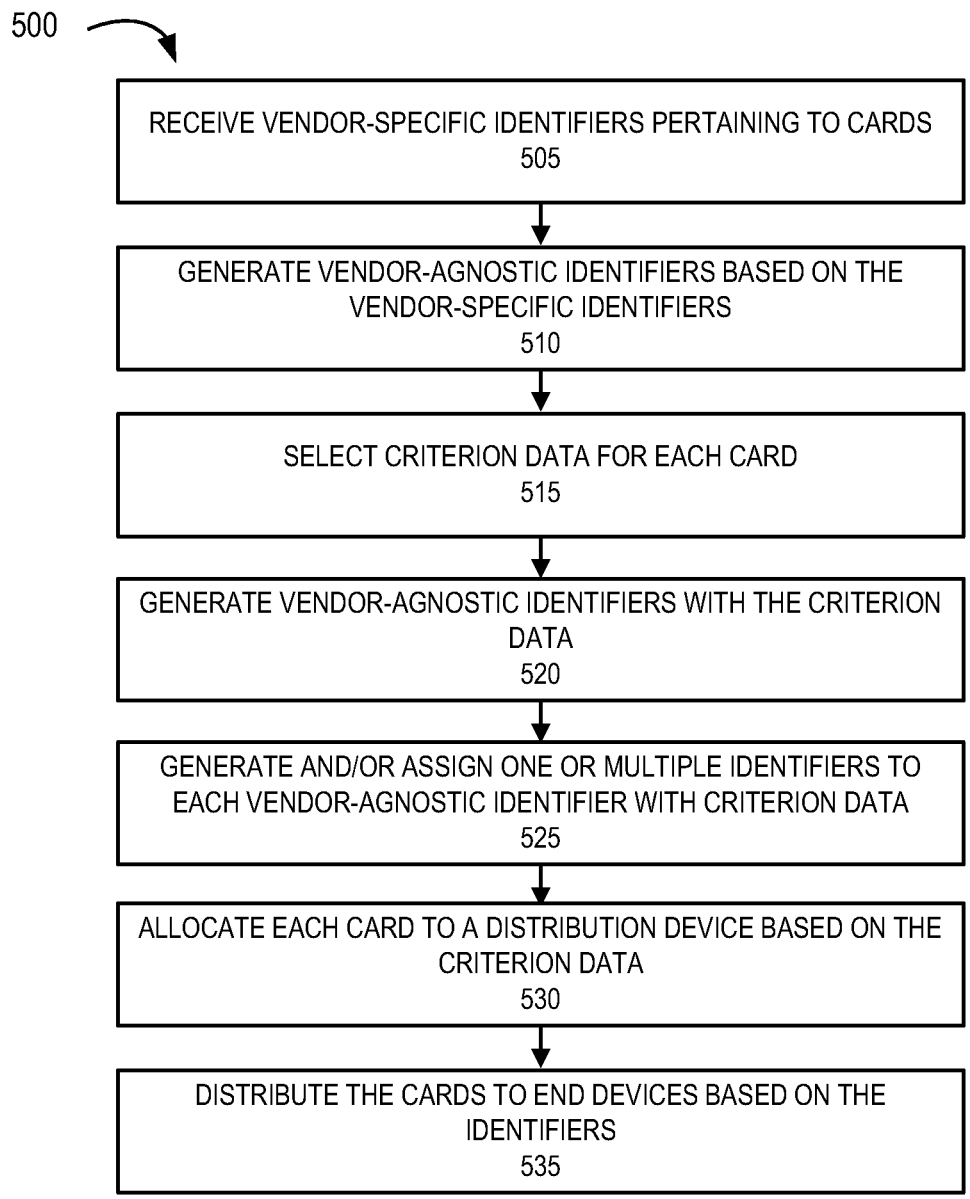
FIG. 5 is a flow diagram illustrating yet another exemplary process of an exemplary embodiment of the card assignment, allocation, and distribution service.

FIG. 5 is a flow diagram illustrating an exemplary process 500 of an exemplary embodiment of the card assignment, allocation, and distribution service. According to an exemplary embodiment, allocation device 107 may perform a step of process 500. According to an exemplary implementation, processor 410 executes software 420 to perform the step of process 500, as described herein. Alternatively, the step may be performed by execution of only hardware.

In block 505, vendor-specific identifiers pertaining to cards may be received. For example, allocation device 107 may receive vendor-specific identifiers from ordering device 105, as described herein. Allocation device 107 may receive other information (e.g., purchasing order information, etc.), as described herein, that may be associated with cards that were ordered by ordering device 105.

In block 510, vendor-agnostic identifiers may be generated based on the vendor-specific identifiers. For example, allocation device 107 may generate vendor-agnostic identifiers based on the identification and removal of vendor data included in the vendor-specific identifiers, as described herein.

In block 515, criterion data for the cards may be selected. For example, allocation device 107 may select criterion data based on purchasing order information, a replenishment procedure, a steering procedure, and/or other criteria, as described herein.

In block 520, vendor-agnostic identifiers with the criterion data may be generated. For example, allocation device 107 may generate or assign criterion data to indicate the selected criterion. Allocation device 107 may generate or assign criteria data based on and/or specific to distribution device 110 of a multi-vendor distribution environment, as described herein. Allocation device 107 may include the criterion data with each of the vendor-agnostic identifiers.

In block 525, one or multiple identifiers may be assigned to each of the vendor-agnostic identifier with criterion data. For example, allocation device 107 may generate or assign globally unique identifiers to the vendor-agnostic identifiers with the criterion data, as described herein.

In block 530, the vendor-agnostic identifiers with criterion data may be allocated to a distribution device. For example, allocation device 107 may allocate and provide the vendor-agnostic identifiers with criterion data and the associated cards to respective distribution devices 110 of a multi-vendor distribution platform environment, based on the criterion data. Allocation device 107 may allocate or provide the cards to the distribution devices 110 based on other data and/or procedures, as described herein.

In block 535, the cards associated with the vendor-agnostic identifiers with criterion data may be distributed to end devices. For example, distribution devices 110 may distribute the cards to end devices 230, as described herein.

FIG. 5 illustrates an exemplary embodiment of a process of the card assignment, allocation, and distribution service, according to other exemplary embodiments, the card assignment, allocation, and distribution service may perform additional operations, fewer operations, and/or different operations than those illustrated and described. For example, allocation device 107 may receive e-cards, may allocate cards before the purchasing order, may allocate cards upon completion or near completion of the assignment and allocation service, provide the allocation to vendor device 115, and other variations, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device, stock keeping units (SKUs) data indicating a vendor, manufacturer, and card product data of cards to be installed by end devices;
   generating, by the network device, first vendor-agnostic identifiers by removal of the vendor and manufacturer data and retention of the card product data of the received SKUs data;
   selecting, for each of the cards, by the network device, criterion data for a portion of the cards indicating a type of distribution device or a type of end device to which one of distribution devices distributes the portion of the cards;
   generating, by the network device based on the selecting, second vendor-agnostic identifiers that include the criterion data and the first vendor-agnostic identifiers;
   allocating, by the network device, the cards and the second vendor-agnostic identifiers to the distribution devices based on the criterion data; and
   providing, by the network device based on the allocating, the cards to the distribution devices which are configured to distribute the cards to the end devices.

2. The method of claim 1, wherein the card product data includes product information pertaining to electronic subscriber identification modules.

3. The method of claim 1, further comprising:
   generating, by the network device, integrated circuit card identifiers for each of the cards.

4. The method of claim 1, wherein the criterion data for a portion of the cards indicates at least one of a first location of one of the distribution devices or a first vendor of multiple vendors associated with the distribution devices, and the criterion data for another portion of the cards indicates at least one of a second location of another one of the distribution devices or a second vendor of the multiple vendors associated with the distribution devices.

5. The method of claim 1, further comprising:
   generating, by the network device, the criterion data based on purchasing ordering information.

6. The method of claim 1, wherein the selecting comprises:
   selecting, by network device, the criterion data based on information associated with an ordering procedure for the cards.

7. The method of claim 1, wherein the SKUs data relate to two or more different vendors and manufacturers associated with the cards.

8. The method of claim 1, further comprising:
   assigning, by the network device, integrated circuit card identifiers to the cards and the second vendor-agnostic identifiers.

9. A network device comprising:
   a processor configured to:
   receive stock keeping units (SKUs) data indicating a vendor, manufacturer, and card product data of cards to be installed by end devices;
   generate first vendor-agnostic identifiers by removal of the vendor and manufacturer data and retention of the card product data of the received SKUs data;
   select, for each of the cards, criterion data for a portion of the cards indicating a type of distribution device or a type of end device to which one of distribution devices distributes the portion of the cards;
   generate, based on the selection, second vendor-agnostic identifiers that include the criterion data and the first vendor-agnostic identifiers;
   allocate the cards and the second vendor-agnostic identifiers to the distribution devices based on the criterion data; and
   provide, based on the allocation, the cards to the distribution devices which are configured to distribute the cards to the end devices.

10. The network device of claim 9, wherein the card product data includes product information pertaining to electronic subscriber identification modules.

11. The network device of claim 9, wherein the processor is further configured to:
    generate integrated circuit card identifiers for each of the cards.

12. The network device of claim 9, wherein the criterion data for a portion of the cards indicates at least one of a first location of one of the distribution devices or a first vendor of multiple vendors associated with the distribution devices, and the criterion data for another portion of the cards indicates at least one of a second location of another one of the distribution devices or a second vendor of the multiple vendors associated with the distribution devices.

13. The network device of claim 9, wherein the processor is further configured to:
    generate the criterion data based on purchasing ordering information.

14. The network device of claim 9, wherein, when selecting, the processor is further configured to:
    select the criterion data based on information associated with an ordering procedure for the cards.

15. The network device of claim 9, wherein the SKUs data relate to two or more different vendors and manufacturers associated with the cards.

16. The network device of claim 9, wherein the processor is configured to:
    assign integrated circuit card identifiers to the cards and the second vendor-agnostic identifiers.

17. A non-transitory computer-readable storage medium storing instructions executable by a processor of a device, wherein the instructions are configured to:
    receive stock keeping units (SKUs) data indicating a vendor, manufacturer, and card product data of cards to be installed by end devices;
    generate first vendor-agnostic identifiers by removal of the vendor and manufacturer data and retention of the card product data of the received SKUs data;
    select, for each of the cards, criterion data for a portion of the cards indicating a type of distribution device or a type of end device to which one of distribution devices distributes the portion of the cards;
    generate, based on the selection, second vendor-agnostic identifiers that include the criterion data and the first vendor-agnostic identifiers;
    allocate the cards and the second vendor-agnostic identifiers to the distribution devices based on the criterion data; and
    provide, based on the allocation, the cards to the distribution devices which are configured to distribute the cards to the end devices.

18. The non-transitory computer-readable storage medium of claim 17, wherein the card product data includes product information pertaining to electronic subscriber identification modules.

19. The non-transitory computer-readable storage medium of claim 17, wherein the instructions are further configured to:
    generate integrated circuit card identifiers for each of the cards.

20. The non-transitory computer-readable storage medium of claim 17, wherein the criterion data for a portion of the cards indicates at least one of a first location of one of the distribution devices or a first vendor of multiple vendors associated with the distribution devices, and the criterion data for another portion of the cards indicates at least one of a second location of another one of the distribution devices or a second vendor of the multiple vendors associated with the distribution devices.

* * * * *